United States Patent
Hudson et al.

(10) Patent No.: US 7,360,755 B2
(45) Date of Patent: Apr. 22, 2008

(54) CAVITATION DEVICE WITH BALANCED HYDROSTATIC PRESSURE

(75) Inventors: Kelly Hudson, Rome, GA (US); Bijan Kazem, Woodstock, GA (US)

(73) Assignee: Hydro Dynamics, Inc., Rome, GA (US)

( * ) Notice: Subject to any disclaimer, the term of this patent is extended or adjusted under 35 U.S.C. 154(b) by 0 days.

(21) Appl. No.: 11/341,147

(22) Filed: Jan. 27, 2006

(65) Prior Publication Data

US 2006/0126428 A1 Jun. 15, 2006

Related U.S. Application Data

(63) Continuation of application No. 10/618,119, filed on Jul. 11, 2003, which is a continuation of application No. 09/747,469, filed on Dec. 20, 2000, now Pat. No. 6,627,784.

(60) Provisional application No. 60/204,838, filed on May 17, 2000.

(51) Int. Cl.
*B01F 3/04* (2006.01)

(52) U.S. Cl. .................... 261/84; 366/279; 366/315; 366/316

(58) Field of Classification Search ................ 261/83, 261/84; 366/172.2, 164.6, 263, 264, 315, 366/316, 279
See application file for complete search history.

(56) References Cited

U.S. PATENT DOCUMENTS

| 1,758,207 | A | * | 5/1930 | Walker .................. 159/1.1 |
| 2,907,455 | A | | 10/1959 | Saski |
| 3,198,191 | A | | 8/1965 | Wyszomirski |
| 3,873,414 | A | | 3/1975 | Rocher et al. |
| 3,948,489 | A | | 4/1976 | Sawyer |
| 4,075,248 | A | | 2/1978 | Marshall et al. |
| 4,273,075 | A | | 6/1981 | Freihage |
| 4,357,931 | A | | 11/1982 | Wolpert et al. |
| 4,490,049 | A | * | 12/1984 | Sanders et al. ............ 366/134 |
| 4,781,151 | A | | 11/1988 | Wolpert et al. |
| 5,082,526 | A | | 1/1992 | Dorris |
| 5,141,328 | A | | 8/1992 | Dilley |
| 5,188,090 | A | | 2/1993 | Griggs |
| 5,385,298 | A | | 1/1995 | Griggs |
| 5,490,727 | A | | 2/1996 | Poschl |
| 5,552,133 | A | | 9/1996 | Lambert et al. |

(Continued)

FOREIGN PATENT DOCUMENTS

CA 2115383 11/1996

(Continued)

*Primary Examiner*—David Sorkin
(74) *Attorney, Agent, or Firm*—Womble Carlyle Sandridge & Rice

(57) ABSTRACT

A method of mixing two or more dissimilar fluids such a gas and a liquid is provided. The method includes the steps of introducing one fluid into the other to form a mixture, inducing cavitation in the mixture to reduce at least one of the fluids to a large number of relatively small units, and distributing the small units uniformly throughout the mixture. In a preferred embodiment, the step of inducing cavitation comprises introducing the mixture into a chamber having a rotating disk formed with a plurality of irregularities such as bores. The irregularities on the rotating disk induce cavitation in the mixture. The cavitation also breaks down van der Waals attractions within the mixture to enhance mixing.

5 Claims, 2 Drawing Sheets

U.S. PATENT DOCUMENTS

| | | |
|---|---|---|
| 5,782,556 A | 7/1998 | Chu |
| 5,810,052 A | 9/1998 | Kozyuk |
| 5,937,906 A | 8/1999 | Kozyuk |
| 5,957,122 A | 9/1999 | Griggs |
| 6,365,555 B1 | 4/2002 | Moser et al. |
| 6,386,751 B1 | 5/2002 | Wooten et al. |
| 6,627,784 B2 | 9/2003 | Hudson et al. |
| 2004/0232006 A1 | 11/2004 | Kazem |
| 2005/0042129 A1 | 2/2005 | Kazem |
| 2005/0067122 A1 | 3/2005 | Kazem et al. |

FOREIGN PATENT DOCUMENTS

| | | |
|---|---|---|
| DE | 2323751 | 11/1974 |
| DE | 3327137 A1 | 2/1984 |
| EP | 0610914 A1 | 8/1994 |
| EP | 0680779 A1 | 11/1995 |
| GB | 2176535 | 12/1986 |
| JP | 48-61704 | 8/1973 |
| JP | 55-102491 | 8/1980 |
| JP | 57-111388 | 7/1982 |
| JP | 60-008391 | 11/1985 |
| JP | 60-226594 | 11/1985 |
| JP | 62-213895 | 9/1987 |
| JP | 60-39262 | 2/1994 |
| JP | 8-218291 | 8/1996 |
| JP | 62-117895 | 5/1997 |
| SU | 1694196 A1 | 11/1991 |
| WO | WO-94/11096 A1 | 5/1994 |

\* cited by examiner

CAVITATION DEVICE WITH BALANCED HYDROSTATIC PRESSURE

REFERENCE TO RELATED APPLICATION

This application is a continuation application of co-pending U.S. patent application Ser. No. 10/618,119, filed on Jul. 11, 2003, which is a continuation application of U.S. patent application Ser. No. 09/747,469, filed on Dec. 20, 2000, now U.S. Pat. No. 6,627,784, which claims the benefit of U.S. Provisional Patent Application No. 60/204,838, filed on May 17, 2000, each of which are incorporated herein by reference in their entirety.

TECHNICAL FIELD

This invention relates generally to mixing and more specifically to methods and devices for mixing dissimilar fluids such as a gas and a liquid or two dissimilar liquids for industrial applications.

BACKGROUND OF THE INVENTION

The mixing together of dissimilar fluids such as a gas and a liquid or two dissimilar liquids has many industrial applications. For example, the mixing of oxygen and a liquid has applications such as the oxygenation of water for biological purposes and the oxygenation of fuel prior to burning to enhance combustion efficiency. The mixing of air and a liquid may be used in the pulp and paper, textile, and other industries in a process known as dissolved air floatation to separate suspended particulate materials from the liquid. Mixing industrial stack gasses with a liquid such as water is useful for removing environmental contaminants from the stack gasses prior to its release to the atmosphere. The mixing of dissimilar fluids such as, for example, oil and water, has industrial application in the creation of emulsions. Further, an existing emulsion may be separated into its constituent components by mixing it with another gas or fluid such as, for example, methane, which acts as an inhibitor to prevent recombination of the constituent components once they are broken apart.

One particular industrial application of gas/liquid mixing occurs in the pulp and paper industry where black liquor, which is a byproduct of cooking wood chips, often is recycled by being burned as a fuel in boilers. Even though such recycling is economically efficient, an emissions problem arises from the fact that untreated black liquor contains concentrations of Sodium Sulfide ($Na_2S$) that can be as high as 40 grams per liter or more. As a result, when untreated black liquor is burned, the Sodium Sulfide contained therein is converted to Sodium Dioxide ($SO_2$) and Hydrogen Sulfide ($H_2S$), which are known as totally reduced sulfur (TRS) compounds. TRS compounds are extremely harmful to the environment and therefore are highly regulated and may not be released to the atmosphere as a component of boiler stack gasses. Accordingly, black liquor often is treated before being burned in order to reduce or eliminate TRS emissions.

One method of treating black liquor prior to burning has been to mix or agitate it with air in a gas/liquid mixing process. When so mixed, Sodium Sulfide within the black liquor is oxidized in a chemical oxidation/reduction or "redux" reaction with oxygen molecules in the air and thereby converted to Sodium Thiosulfate ($Na_2S_2O_3$). Unlike Sodium Sulfide, Sodium Thiosulfate exists in a stable chemical state and thus does not participate in chemical reactions when the treated black liquor is burned in a boiler. Instead, the Sodium Thiosulfate simply precipitates to the bottom of the boiler, where it is ejected as a smelt.

Prior art industrial methods of mixing gases and liquids in general, and air and black liquor in particular, have involved introducing air in the form of bubbles into black liquor and agitating the mixture to break up the air bubbles and distribute them throughout the liquor. The goal, of course, is that oxygen molecules in the air will react chemically with or "oxidize" sodium sulfide molecules in the black liquor, rendering them inert during combustion of the black liquor. In one prior art process, such mixing is accomplished with rotating mechanical beaters having blades that impact and cut up the air bubbles while agitating the liquid. The problem with such a system, however, is that there is a natural lower limit to the size of the resulting air bubbles because larger bubbles cannot be cut or chopped to a size smaller than the size of the beater blades. Thus, the total composite surface area of the air bubbles in contact with the black liquor is severely limited. As a result, the probability that an oxygen molecule within an air bubble will come into contact with and oxidize a Sodium Sulfide molecule within the black liquor is reduced.

A further exacerbating problem and limitation of prior art gas/liquid mixing methods in general, and black liquor oxidation processes in particular, arises from the fact that the bubbles that are created by the mechanical beater blades of the mixing apparatus tend not to be distributed evenly throughout the black liquor. Instead, the bubbles, partially because of their relatively large size and partially because of the mechanical nature of the process, tend to agglomerate or concentrate into pockets of bubbles separated by relative voids in the liquor. This further reduces the probability that an oxygen molecule within an air bubble with come into contact with or "find" a Sodium Sulfide molecule and thus reduces the efficiency of the oxidation process. To address this inefficiency, it may be necessary to inject many times the amount of air necessary to oxidize the Sodium Sulfide into the mixer and to increase mixing times substantially to increase the probability of oxidation. However, such a brute force method of increasing oxidation efficiency substantially increases the time, energy, and resources required in the mixing process and thus introduces its own inefficiencies.

A final limitation of prior art gas/liquid mixing methods as applied to the oxidation of black liquor is imposed by the fact that the molecules within the liquor are attracted to each other by weak molecular forces known as van der Waals attraction. This results in the molecules clumping together in mutually attracted groups. In many cases, a Sodium Sulfide molecule that needs to come into contact with an oxygen molecule within a bubble in order to be oxidized may be surrounded within such a group by other molecules within the liquid and thus shielded from contact with a bubble and an oxygen molecule. In these cases, oxidation of the Sodium Sulfide molecule can not occur regardless of the volume of gas introduced or the length of the mixing process. This is due, in part at least, to the fact that the energy imparted to the liquor by mechanical beater blades is far less than that required to break the van der Waals attractions and free trapped molecules. In effect, then, the molecular Van der Waals attraction within the liquor imposes a physical limit to the percentage of Sodium Sulfide molecules within black liquor that can be oxidized with traditional gas/liquid mixing techniques.

Thus, a specific need exists for a gas/liquid mixing method and apparatus applicable to the oxidation of black liquor in the pulp and paper industry that overcomes the problems, shortcomings, and limitation of prior art processes. More generally, a need exists for a new and unique method of mixing dissimilar fluids, be they gasses and liquids, dissimilar liquids, or otherwise, that is highly efficient, that results in virtually complete mixing in a short time and with a minimum of required energy and resources, and, in the case of oxidation applications, overcomes the physical limits on oxidation efficiency imposed by molecular van der Waals attraction. It is to the provision of such a method and an apparatus for carrying out the method that the present invention is primarily directed.

For clarity of disclosure and discussion, the present invention will be discussed herein primarily in the context of its application to the oxidation of environmental contaminants such as Sodium Sulfide in black liquor within the pulp and paper industry. Such an application is considered by the inventors to be a best mode of carrying out the invention. It will be understood and appreciated, however, that the method and apparatus of the invention is applicable to virtually any situation where dissimilar fluids are to mixed together for industrial or commercial purposes. For example, the invention is applicable in the pulp and paper industry alone to a variety of processes including micro-mixing prior to gasification, mixing stack gases with black liquor in direct contact evaporators, mixing salt cake and black liquor, pulp drying, sludge dewatering, oxygen de-lignification, pulp bleaching by mixing pulp with ozone or other appropriate gases, and atomization of black liquor prior to its use in a recovery boiler. In the petroleum industry, the invention is applicable among other things to the separation of tight emulsions using micro-mixing and to heavy oil upgrading. Within the food processing industry, the mixing methodology of the invention has application in homogenization, oxygenation, and spice mixing processes. Applications within the environmental industry include oxidation/reduction of liquids or components of liquids, concentration and evaporation, BOD and COD reduction, dissolved air floatation, and fuel aeration. Thus, the discussion of the invention herein within the context of black liquor oxidation should not be interpreted as a limitation of the invention but only as representing a preferred embodiment or application and a best mode of carrying out the invention.

SUMMARY OF THE INVENTION

Briefly described, the present invention in a preferred embodiment thereof, comprises a unique and highly efficient method of mixing dissimilar fluids together by mechanically inducing cavitation within the fluids in a controlled manner. The result and goal is to obtain mixing on a microscopic level, uniform distribution of one fluid throughout another, and a breaking of van der Waals attractions between molecules within the fluids. In the preferred embodiment and best mode, the invention comprises a method of oxidizing environmentally hazardous compounds such as Sodium Sulfide within black liquor in the pulp and paper industry by mixing air with black liquor using controlled mechanically induced cavitation. The result is a virtually complete oxidation of the hazardous compounds and thus assurance that environmental toxins are not created when the black liquor is burned.

The methodology of the invention, in the context of oxidizing black liquor, comprises the steps of introducing and entraining air in the form of bubbles into a stream of black liquor to form a mixture of black liquor and air bubbles. The liquor/air bubble mixture is then directed into a hydrosonic mixer, which generally comprises a rapidly spinning rotor disposed within a cylindrical chamber within a housing. The rotor is provided with one or more arrays of relatively shallow holes or bores formed around its periphery. A space, referred to herein as a cavitation zone, is formed between the periphery of the rotor and the cylindrical wall of the housing chamber.

As the mixture of gas bubbles and black liquor passes through the cavitation zone, microscopic cavitation bubbles are continuously generated and collapse within the mixture by the action of the bores on the periphery of the spinning rotor.[1] The collapse of these cavitation bubbles creates violent and continuous cavitation within the gas/fluid mixture in the cavitation zone, and the energy of this cavitation acts to break up the air bubbles within the mixture into ever smaller bubbles or units. Since the minimum size of the air bubbles is not limited as in prior art mixers, the air bubbles are reduced by the cavitation into millions of substantially microscopic bubbles. Thus, the total surface area of air bubbles in contact with black liquor is significantly greater than in prior art mixers. The increased surface area increases the probability that an oxygen molecule within an air bubble will come into contact with and oxidize a Sodium Sulfide molecule within the black liquor. Further, because of the relatively violent agitation within the cavitation zone caused by rotor motion and cavitation effects, these microscopic air bubbles are mixed completely and uniformly throughout the black liquor, which further enhances the probability of contact between an oxygen molecule and a Sodium Sulfide molecule. Finally, the energy imparted to the mixture by the cavitation within the cavitation zone is more than sufficient to overcome the van der Waals attraction between molecules within the black liquor. This breaks apart the molecule clumps and frees Sodium Sulfide molecules that may be jacketed or shielded by other molecules within the black liquor. These freed molecules, then, are available to be contacted and oxidized by an oxygen molecule within one of the microscopic air bubbles.

[1] The term "cavitation zone" is used herein to refer to the region between the outer periphery of the rotor wherein the bores are formed and the cylindrical wall of the housing chamber. This is where the most intense cavitation activity occurs. It should be understood, however, that cavitation may occur, albeit with less intensity, in regions other than this space such as, for example, in the reservoir or region between the sides or faces of the rotor and the housing. Thus "cavitation zone" is used herein to refer to the region of most intense cavitation, but should not be interpreted as an implication that cavitation cannot occur at some level in other regions of the hydrosonic mixer.

As a result of the creation and uniform distribution of microbubbles and the breaking of the van der Waals attractions, virtually complete oxidation of the Sodium Sulfide component of the black liquor is accomplished within the hydrosonic mixer. (Of course, a small amount of oxidation also may occur outside the mixer such as, for example, in the supply and outlet conduits of the system.) Further, the process can be accurately controlled by selecting rotation rate of the rotor and the amount of air initially introduced into the black liquor such that the complete oxidation is accomplished within a minimum time and with a minimum of energy and required introduction of air. The overall result is a gas/liquid mixing process that is far more efficient, faster, and more effective than is possible with prior art mechanical mixers. Once the Sodium Sulfide in the black liquor has been oxidized, the treated black liquor can be burned in a boiler with minimum of environmental toxins being produced and released to the atmosphere in stack gasses.

Thus, a method of mixing dissimilar fluids such as air and black liquor is now provided that addresses and overcomes the problems and shortcomings of the prior art. The method is highly efficient and effective and results in virtually complete oxidation of target components within black liquor or other liquids. These and other features, objects, and advantages of the methodology of this invention will become more apparent upon review of the detailed description set forth below when taken in conjunction with the accompanying drawing figures, which are briefly described as follows.

DETAILED DESCRIPTION OF THE PREFERRED EMBODIMENTS

As mentioned above, the methodology of the present invention will be described within the context of its application to the oxidation of environmentally harmful compounds within black liquor in the pulp and paper industry. While this represents a preferred application and a best mode of carrying out the invention, it will be understood that the invention has numerous other applications wherever mixing of dissimilar fluids is required. In this regard, numerous examples of the application of the present invention in other mixing environments will be described following the detailed description of its application to black liquor oxidation.

Figure 1:
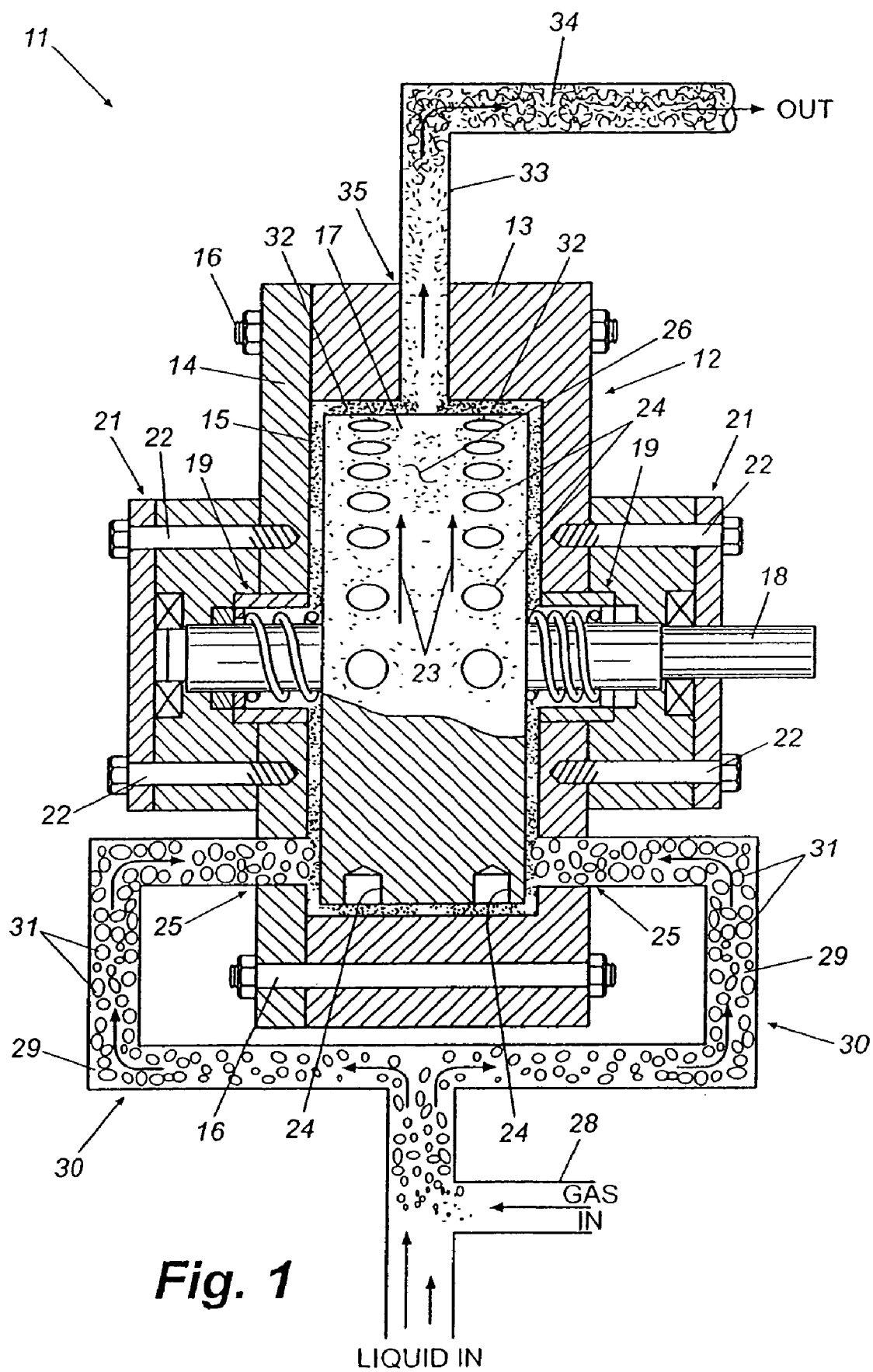
FIG. 1 is a partially sectioned view illustrating one preferred embodiment of an apparatus for mixing dissimilar fluids such as a gas and a liquid according to the present invention.

Referring now in more detail to the drawings, in which like numerals refer to like parts throughout the several views, FIG. 1 illustrates a preferred embodiment of a hydrosonic mixer for carrying out the present invention. The hydrosonic mixer 11 comprises a cylindrical housing 12 defining an internal cylindrical chamber 15. In the illustrated embodiment, the housing 12 is formed of a casing 13 capped by an end plate 14 secured to the casing with bolts 16. Obviously, however, the housing 12 may be formed in other ways such as, for example, a central cylindrical shell capped by two end plates.

Figure 2:
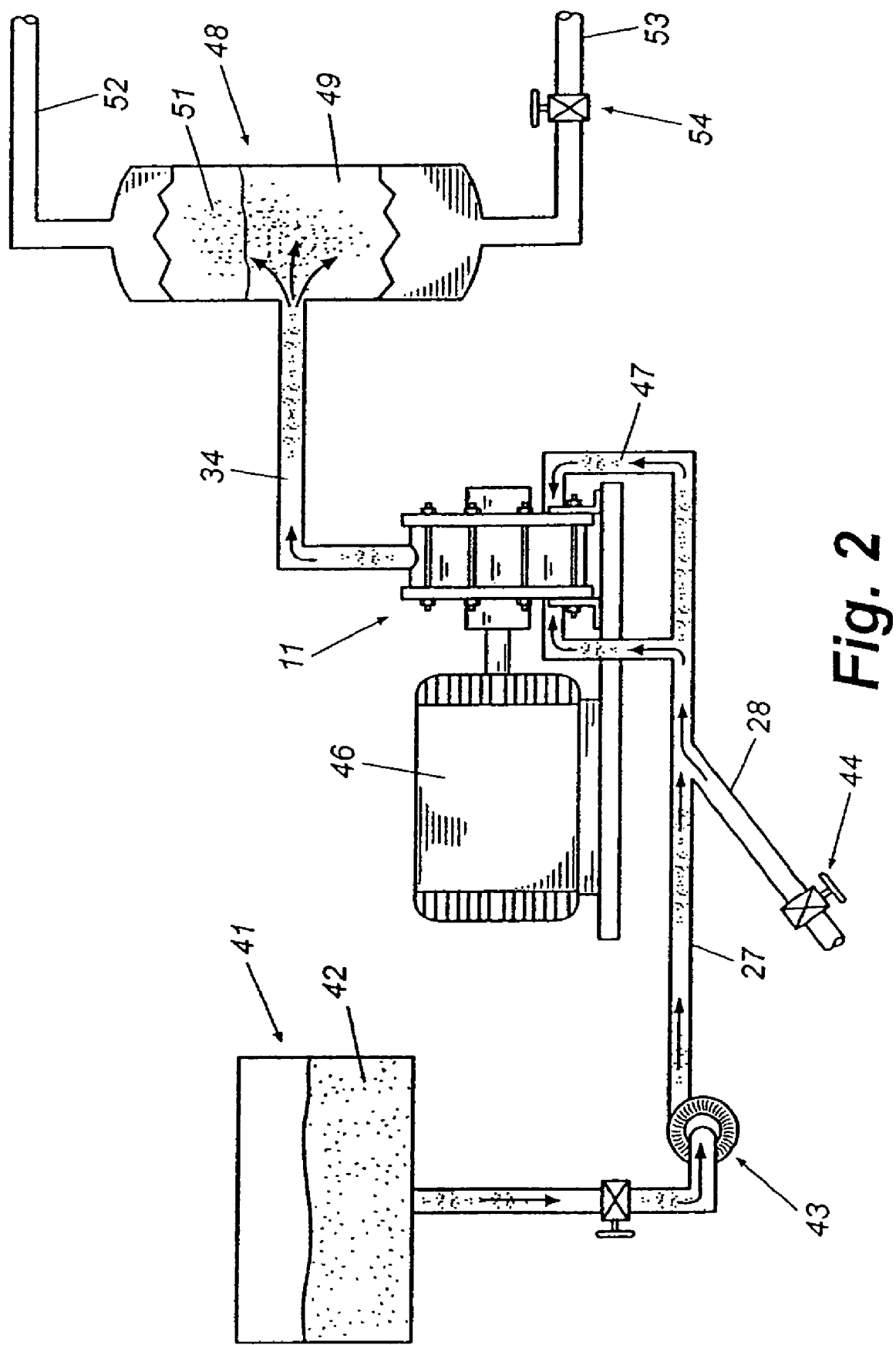
FIG. 2 is an illustration of the apparatus of FIG. 1 functioning in a system for oxidizing black liquor for use in the pulp and paper industry.

A cylindrical rotor 17 is disposed within the cylindrical chamber 15 of the housing and is mounted on an axially extending shaft 18. The shaft 18 is journaled on either side of the rotor within bearing assemblies 19 that, in turn, are mounted within bearing assembly housings 21. The bearing assembly housings 21 are secured to the housing 12 by means of appropriate fasteners such as bolts 22. The shaft 18 projects from one of the bearing housings 21 for being coupled to a motive means such as an electric motor 46 (FIG. 2). It will thus be seen that the rotor 17 may be spun or rotated within the cylindrical chamber 15 in the direction of arrows 23 by activating the motor 46 coupled to the shaft 18.

The rotor 17 has a peripheral surface that is formed with one or more circumferentially extending arrays of irregularities in the form of relatively shallow holes or bores 24. In the illustrated embodiment, the rotor 17 is provided with two arrays of bores 24 separated by a void 26, the purpose of which is described in more detail below. It should be understood, however, that fewer or more than two arrays of bores may be provided in the peripheral surface of the rotor as desired depending upon the intended application of the hydrosonic mixer 11. Further, irregularities other than holes or bores also may be provided. The rotor 17 is sized relative to the cylindrical chamber 15 in which it is housed to define a space, referred to herein as a cavitation zone 32, between the peripheral surface of the rotor and the cylindrical wall of the chamber 15.

Inlet ports 25 are provided in the housing 12 for supplying fluids to be mixed to the interior chamber 15 within the housing. Supply conduits 30 are coupled to the inlet ports 25. A liquid supply conduit 27 is coupled to the supply conduits 30 for supplying liquid such as black liquor to the hydrosonic mixer 11. A gas supply conduit 28 communicates with the liquid supply conduit 27 for introducing and entraining gas in the form of bubbles within the stream of liquid flowing through the liquid supply conduit 27.

In the case of black liquor oxidation, within the context of which the present invention is described, black liquor is pumped through the liquid supply conduit 27 and air, which contains oxygen, is supplied through the gas supply conduit 28. At the junction of the liquid supply conduit 27 and the gas supply conduit 28, the black liquor and air form a gas/liquid mixture in the form of relatively large air bubbles 31 entrained within the flow of black liquor 29. This mixture of black liquor and air bubbles is directed into the cylindrical chamber 15 of the housing 12 through the supply conduits 30 and inlet ports 25 as shown. In the illustrated embodiment, an inlet port 25 is provided on either side of the housing 12 in order to equalize the hydraulic pressure on the rotor 17 to prevent undue stress on the bearing assemblies 19. However, this particular configuration is not a limitation of the invention and other configurations of inlet ports may be provided if desired.

An outlet port 35 is provided in the housing 12 and, in the illustrated embodiment, is located in the cylindrical wall of the housing to communicate with the cavitation zone 32 in a region of the rotor intermediate or between the arrays of bores 24. Location of the outlet port 35 in this way ensures that the entire volume of the gas/liquid mixture traverses at least one of the arrays of bores 24 and thus moves through a cavitation zone prior to exiting the hydrosonic mixer 11. Further, location of the outlet port 35 within the region of the inner chamber 15 aligned with the void 26 of the rotor prevents cavitation damage that otherwise might occur if the outlet port 35 were aligned with an array of bores 24. An outlet conduit 33 is coupled to the outlet port 35 for receiving treated black liquor and excess air from the hydrosonic mixer 11 and delivering it to a remote location for separation of the excess air from the treated black liquor and subsequent use of the treated black liquor.

In operation, the hydrosonic mixer 11 of FIG. 1 functions to oxidize environmentally harmful compounds within the black liquor essentially as follows. Black liquor, which contains, among many other compounds, the environmentally harmful compound sodium sulfide is pumped through the liquid supply conduit 27 to the supply conduit 30. Air is supplied through the gas supply conduit 28 to the stream of black liquor and the air and black liquor form a mixture comprised of relatively large air bubbles 31 entrained within the black liquor 29. The black liquor/air bubble mixture moves through the supply conduits 30 and enters the chamber 15 through supply ports 25 on either side of the rotor 17.

From the supply ports 25, the mixture moves toward the periphery of the rapidly rotating rotor 17 and enters the cavitation zones 32 in the region of the bores 24. As described in substantial detail in our previously issued U.S. Pat. No. 5,188,090, the disclosure of which is hereby incorporated by reference, within the cavitation zones 32, millions of microscopic cavitation bubbles are formed in the mixture within and around the rapidly moving bores 24 on the rotor. Since these cavitation bubbles are unstable, they collapse rapidly after their formation. As a result, the millions of microscopic cavitation bubbles continuously form and collapse within and around the bores 24 of the rotor, creating cavitation induced shock waves that propagate through the mixture in a violent albeit localized process.

As the mixture of black liquor and relatively large air bubbles moves into and through the cavitation zones 32, the air bubbles in the mixture are bombarded by the microscopic cavitation bubbles as they form and further are impacted by the cavitation shock waves created as the cavitation bubbles collapse. This results in a "chopping up" of the relatively large air bubbles into smaller air bubbles, which themselves are chopped up into even smaller air bubbles and so on in a process that occurs very quickly. Since the cavitation bubbles that cause the reduction of air bubbles into ever smaller air bubbles are microscopic in size, the practical lower limit to the size of the resulting air bubbles inherent in prior art mechanical mixing methods do not exist. Thus, the original air bubbles are continuously chopped up and reduced to millions of tiny microscopic air bubbles within the cavitation zone. The result is a total composite air bubble surface area in contact with the black liquor that is far greater than that possible in prior art mixing methods. Consequently, the probability that an oxygen molecule in an air bubble will "find" and come into contact with a sodium sulfide molecule within the black liquor is greatly increased.

In addition to creating a much larger surface area of air contacting the black liquor, the rapid rotary motion of the rotor within the housing in conjunction with the turbulent cavitation activity in the cavitation zones causes the very small air bubbles that are created to be distributed through the black liquor in an extremely uniform manner. This further increases the probability that oxygen molecules within the air bubbles will come into contact with sodium sulfide molecules within the black liquor. Such uniform distribution of air bubbles throughout the liquid has been confirmed by observing the electric current drawn by an electric motor driving the rotor. When air bubbles are introduced into the flow of black liquor, this current quickly reaches an equilibrium point, where it remains extremely constant for a given flow of air into the black liquor. If the air bubbles were not uniformly distributed the current drawn by the motor would fluctuate as the motor encountered pockets of more and less uniformly distributed bubbles within the black liquor. Thus, uniform current draw confirms the uniform distribution of bubbles throughout the black liquor.

Finally, the violent cavitation activity within the cavitation zone imparts sufficient energy to the mixture to break or loosen the molecular van der Waals attractions between the molecules within the black liquor. This results in a breaking up of molecule clusters within the black liquor thereby freeing sodium sulfide molecules that may be surrounded and shielded by other molecules within the liquor. These freed molecules are then available to come into contact with an oxygen molecule within an air bubble and thereby be oxidized. Therefore, the methodology of this invention also affects the black liquor on a molecular level to enhance and increase the percentage of sodium sulfide molecules within the black liquor that are oxidized.

After the black liquor has been treated and its environmentally hazardous compounds oxidized as described, it flows out of the chamber 15 along with residual air bubbles through the outlet port 35. At this point, the excess air within the black liquor quickly begins to agglomerate into larger and larger air bubbles, which naturally separate from the black liquor due to their buoyancy. The oxidized black liquor, which contains substantially smaller quantities of sodium sulfide than with prior art mixing processes, may be used as a fuel in the usual way without producing unacceptable levels of environmental toxins as described above.

FIG. 2 illustrates in a simplified schematic form the application of the present invention for oxidizing black liquor in an industrial setting within the pulp and paper industry. A hydrosonic mixer 11 according to the present invention is powered by a conventional electric motor 46, which spins or rotates the rotor within the mixer at a rapid rate. A holding tank 41 contains a volume of untreated black liquor 42. The untreated black liquor 42 is pumped from the holding tank 41 by a pump 43 to the inlet ports of the hydrosonic mixer 11. Air is supplied to and entrained in the form of bubbles within the flow of black liquor through the gas supply conduit 28. The volume of air supplied to the flow of black liquor is controllable with a valve 44. As the black liquor/air bubble mixture passes through the hydrosonic mixer 11, environmentally harmful compounds within the black liquor are oxidized and rendered inert as described above. The treated black liquor and excess air 34 is then delivered to a reservoir tank 48, where excess air 51 within the black liquor 49 naturally separates by floating to the surface of the black liquor. The excess air can be vented through a vent 52. The remaining black liquor, with its environmentally harmful compounds oxidized, can then be drawn from the reservoir tank 48 through a conduit 53 and valve 54 for subsequent environmentally clean combustion to provide heat where required in the paper making process.

As mentioned above, the methodology of the present invention has been described within the context of oxidizing environmentally harmful compounds within black liquor in the pulp and paper industry. However, the method is equally applicable to a wide variety of industrial processes, some of which are discussed briefly as follows.

1. Oxidation: The term "oxidation" is used throughout this specification to refer to an interaction between two compounds wherein a chemical reaction occurs between the compounds. Oxidation may, as in the case of the oxidation of black liquor discussed above, involve a chemical reaction with oxygen; however, the term "oxidation" as used herein is not intended to be limited to such reactions but rather to include chemical reactions between any elements and/or compounds. Such reactions may include classic oxidation/reduction reactions as well as other types of chemical reactions. The oxidation of environmentally harmful compounds within black liquor in the pulp and paper industry as described above is one example of the application of the present invention for oxidation. Other examples include, but are not limited to, satisfying biological oxygen demand (BOD) and chemical oxygen demand (COD) requirements in the wastewater treatment industry prior to discharging treated wastewater into rivers. In addition to the oxidation of black liquor in the pulp and paper industry, white liquor also may be oxidized for use in bleaching operations. Broadly, the methodology of the present invention is applicable to any situation where one substance is to be mixed with another in such a way that a chemical reaction occurs between the substances or a compound that is an integral part of one or more of the substances.

2. Oxygenation: The mixing of oxygen (or another gas) with a liquid in such a way that the oxygen molecules are trapped and held by van der Waals attractions between the liquid molecules is known as oxygenation. Oxygenation differs from oxidation in that a chemical reaction between the gas and liquid molecules does not occur but, instead, the gas molecules are dissolved in the liquid and loosely held between the liquid molecules. Oxygenation of liquids has applications, for example, in the oxygenation of fuels and fuel oils to enhance burning efficiency in boilers and in the oxygenation of water in aquariums and other aquatic tanks to provide essential oxygen to aquatic animals. Oxygenated drinking water also is becoming popular among many people.

Efficient and effective oxygenation of liquids may be obtained with the method of the present invention in much the same way as oxidation. Air in the form of bubbles is introduced into the liquid to be oxygenated and the mixture is introduced into the hydrosonic mixer, where the air bubbles are transformed into millions of microscopic bubbles by cavitation effects. The microscopic air bubbles are then distributed uniformly through the liquid and, at the same time, the van der Waals attractions between the liquid molecules are weakened or broken by the cavitation effects. Subsequently, when the molecules again begin to cluster as a result of van der Waals attractions, air or oxygen molecules become trapped and held within clusters of liquid molecules and the liquid is oxygenated. Because of the exceedingly small air bubbles, uniform distribution, and van der Waals effects, the methodology of the present invention results in substantially enhanced oxygenation efficiency over prior art techniques.

3. Heat Extraction From Stack Gases: In some applications, it is desirable to extract the heat from stack gases emanating from furnaces and boilers and to use the extracted heat in a constructive way such as to heat a liquid. Mixing of the hot stack gases with a liquid is one method of transferring the heat of the stack gases into the liquid. Other methods such as passing the gases through a heat exchanger immersed in the liquid also have been used to accomplish this goal. The methodology of the present invention is particularly efficient at transferring heat from hot stack gases to a liquid. In such an application, the hot stack gases are introduced into a stream of liquid and the mixture is directed into the hydrosonic mixer. Here, as in oxidation and oxygenation, the stack gases are distributed uniformly throughout the liquid. Because of the large composite area of contact between the hot stack gas bubbles and the liquid, the heat of the gases is transferred efficiently and effectively to the liquid. Thus, heat energy otherwise lost to the atmosphere or transferred inefficiently with prior art techniques is transferred to and heats the liquid. The stack gases (now cooled) and the liquid (now heated) can then be separated and the stack gases released to the atmosphere. Accordingly, the method of the invention may be applied in a highly efficient and effective process for recapturing and using the heat of stack gases.

4. Dissolved Air Flotation: Dissolved air flotation is a process whereby air (or another gas) is introduced into and mixed in a liquid having suspended particles that need to be separated from the liquid. Generally, the air molecules and small bubbles of air, once mixed in the liquid, attach themselves to the suspended particles within the liquid causing them to float to the surface of the liquid where they can be removed. Dissolved air flotation may be used, for example, in the pulp and paper industry to remove suspended fibers from a liquid. The method of the present invention is well suited for dissolved air flotation. In practicing the method for this application, air is introduced into the liquid and the mixture is directed to the hydrosonic mixer. There, the air bubbles are reduced to microscopic size and distributed uniformly through the liquid, resulting in a higher probability that the air bubbles will attach themselves to the suspended particles to be separated from the liquid. Upon leaving the hydrosonic mixture, the liquid may be directed to a separation tank, where the particles float to the surface under the buoyant influence of the attached air bubbles and can be skimmed or otherwise removed.

5. Mixing Of Dissimilar Fluids: In many industrial applications, it is desirable to mix two dissimilar fluids such as, for example, water and oil, to form an emulsion. The making of caulking compounds and the formation of oil and water emulsions are examples of such applications. The method of the present invention may be applied efficiently to form emulsions from dissimilar fluids. More specifically, one of the fluids, water for example, is introduced into a stream of the other fluid, oil for example, and the mixture is fed to the hydrosonic mixer. In the mixer, the cavitation bubbles and shock waves created mechanically by the rotating rotor impact the liquids breaking them down into extremely small units or droplets. The droplets are then distributed uniformly together by the violent agitation within the mixer. This, in conjunction with the weakening or breaking of the van der Waals attractions between fluid molecules, results in the small droplets of the fluids being attracted to and "holding onto" one another to form a tight and uniform emulsion.

6. Separation Of Emulsified Liquids: In some cases, it is desirable to separate a tight emulsion into its component liquids. For example, in the oil industry, oil from a well may take the form of an oil/water emulsion and it is necessary to separate the water from the oil prior to further processing. One way to accomplish this is to mix a gas, such as methane, with the oil/water emulsion to interfere with the van der Waals attraction between the oil and water molecules. The method of the present invention has been found to accomplish this task in a very reliable and efficient way. More specifically, the gas, methane for example, is introduced into a stream of the emulsion and the mixture is directed to the hydrosonic mixer according to the invention. In the mixer, the van der Waals attractions between the molecules of the two fluids in the emulsion are broken down and the methane gas is reduced to microscopic bubbles and distributed uniformly throughout the emulsion. Under these conditions, the methane gas molecules may attach themselves to one of the liquids preventing it from recombining with the other liquid and thereby separating the emulsion into its constituent components. The separated liquids may then be drawn off separately by conventional methods.

7. Atomization of Fuels to Enhance Burning

Atomizing a fuel before it is burned enhances the combustion efficiency of the fuel by exposing a significantly larger surface area of the fuel to heat and oxidizer. The mixing methodology of the present invention is well suited to the atomization of fuels. In an atomization application, a gas, which may be an oxygen containing gas to enhance burning further or may be an inert gas, is mixed with the fuel in the hydrosonic mixer according to the invention. The gas is broken down in to microscopic bubbles and dispersed uniformly throughout the fluid. This mixture may then be delivered to a boiler or other device in which the fuel is to be burned, where it is ejected as an atomized spray comprising very tiny droplets. The burning efficiency of the fuel is therefore enhanced.

The invention has been described and disclosed herein in terms of preferred specific examples, embodiments, and methodologies that represent the best mode known to the inventors of carrying out the invention. However, the invention is not limited to these illustrative embodiments and many other applications and variations may be made within the scope of the invention. Further, devices with configurations other than that illustrated herein for mechanically inducing cavitation effects used in the method of the invention are possible, the illustrated devices being only exemplary illustrations. In general, any mechanical apparatus capable of producing the cavitation effects described herein for purposes of mixing two dissimilar fluids is considered to be within the scope of the invention. These and many other additions, deletions, and modifications to the disclosed embodiments and methodologies may well be made by those of skill in the art without departing from the spirit and scope of the invention as set forth in the claims.

What is claimed is:

1. An apparatus for mixing two or more fluids by inducing cavitation, said apparatus comprising:
    a housing defining a substantially cylindrical interior chamber bounded by spaced substantially planar side walls joined by a cylindrical peripheral wall;
    a substantially cylindrical rotor rotatably mounted within said interior chamber, said rotor having an axis, spaced substantially planar sides, and a cylindrical peripheral surface joining said planar sides;
    said cylindrical peripheral surface of said rotor and said cylindrical peripheral wall of said chamber defining therebetween an annular space having a substantially uniform dimension in the axial direction of said rotor;
    a first array of spaced bores formed in said peripheral surface of said rotor, each bore of said first array extending radially into said rotor a predetermined distance and opening into said annular space;
    said bores of said first array being arranged in a first row that extends around said cylindrical peripheral surface of said rotor;
    a second array of spaced bores formed in said peripheral surface of said rotor, each bore of said second array extending radially into said rotor a predetermined distance and opening into said annular space;
    said bores of said second array being arranged in a second row that extends around said cylindrical peripheral surface of said rotor;
    said first row of bores and said second row of bores being spaced apart in the axial direction of said rotor and defining therebetween a void zone wherein no bores are formed in said peripheral surface of said rotor;
    a first fluid inlet in said housing positioned to introduce fluid into said chamber at a first predetermined location adjacent one of said substantially planar sides of said rotor;
    a second fluid inlet in said housing positioned to introduce fluid into said chamber at a second predetermined location adjacent the other one of said substantially planar sides of said rotor;
    said second fluid inlet being substantially axially aligned with said first fluid inlet to equalize pressure on said rotor as fluid is introduced into said chamber through said fluid inlets;
    a fluid outlet in said housing positioned for withdrawal of fluid from said chamber at a third predetermined location adjacent said cylindrical peripheral surface of said rotor;
    said third predetermined location being aligned within said void zone defined between said first row of bores and second row of bores for withdrawal of fluid after it has passed a row of bores and to minimize cavitation damage at the location of said fluid outlet.

2. The apparatus of claim 1 and wherein the two or more fluids to be mixed comprise two or more dissimilar fluids.

3. The apparatus of claim 2 and wherein at least one of the fluids to be mixed is a gas.

4. The apparatus of claim 3 and wherein at least one of the fluids to be mixed is a liquid.

5. The apparatus of claim 2 and wherein at least one of the fluids to be mixed is a liquid.

* * * * *